United States Patent
Chen et al.

(10) Patent No.: US 10,969,233 B2
(45) Date of Patent: Apr. 6, 2021

(54) TRAJECTORY DATA COMPRESSION

(71) Applicant: International Business Machines Corporation, Armonk, NY (US)

(72) Inventors: Xiao Yan Chen, Beijing (CN); Raghu K. Ganti, Elmsford, NY (US); Sheng Huang, Shanghai (CN); Kai Liu, Beijing (CN); Ramya Raghavendra, White Plains, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/116,423

(22) Filed: Aug. 29, 2018

(65) Prior Publication Data

US 2019/0011272 A1 Jan. 10, 2019

Related U.S. Application Data

(63) Continuation of application No. 15/144,379, filed on May 2, 2016, now Pat. No. 10,088,324.

(51) Int. Cl.
*G01C 21/34* (2006.01)
*G01C 21/32* (2006.01)
*G06F 16/29* (2019.01)

(52) U.S. Cl.
CPC ......... *G01C 21/3407* (2013.01); *G01C 21/32* (2013.01); *G06F 16/29* (2019.01)

(58) Field of Classification Search
CPC ................................................ G01C 21/3407
See application file for complete search history.

(56) References Cited

U.S. PATENT DOCUMENTS

| 7,203,693 B2 | 4/2007 | Carlbom et al. |
| 7,672,369 B2 | 3/2010 | Garakani et al. |
| 8,155,880 B2 | 4/2012 | Patel et al. |

(Continued)

OTHER PUBLICATIONS

Xu et al., "Adaptive Location Constraint Processing", Proceedings of teh 2007 ACM SIGMOD International Conference on Management of data, ACM, 2007, SIGMOD'07, Jun. 11-14, 2007, Beijing, China.

Speičys et al., "Computational Data Modeling for Network-Constrained Moving Objects", Proceedings of the 11th ACM International Symposium on Advances in Geographic Information Systems, ACM, 2003, GIS'03, Nov. 7-8, 2003, New Orleans, Louisianna, USA, pp. 118-125.

(Continued)

*Primary Examiner* — Aaron L Troost
(74) *Attorney, Agent, or Firm* — Scully, Scott, Murphy & Presser, P.C.; Vazken Alexanian (57) ABSTRACT

A method, computer system, and computer readable product for trajectory data compression are disclosed. In embodiments, the method comprises generating spatial data for one or more moving objects; projecting the data onto a network comprised of a plurality of trajectories, the network constraining movement of the one or more moving objects; and storing the projected data in a data store. In embodiments of the invention, the method further comprises translating updates and queries to the spatial data, using specified data of the network, into links to the data store, and using the links to update and query the data store. In embodiments of the invention, the specified data of the network are stored in a network store. In embodiments of the invention, each of the trajectories includes one or more sub-trajectories, and the projecting the spatial data onto a network includes projecting the spatial data onto the sub-trajectories.

20 Claims, 7 Drawing Sheets

(56) References Cited

U.S. PATENT DOCUMENTS

| | | |
|---|---|---|
| 9,041,718 B2 | 5/2015 | Matthews et al. |
| 2008/0262721 A1* | 10/2008 | Guo ................... G01C 21/32 |
| | | 701/532 |
| 2014/0297651 A1 | 10/2014 | Shadmon |
| 2014/0365478 A1 | 12/2014 | Enoki et al. |
| 2017/0300540 A1 | 10/2017 | Karpistsenko et al. |

OTHER PUBLICATIONS

Frentzos et al., "Trajectory Database Systems", Mobility, Data Mining and Privacy, Chapter 6, Springer-Verlag Berlin Heidelberg 2008, pp. 151-187.

Marketos, "Data Warehousing & Mining Techniques for Moving Object Databases", PhD Thesis, Degree in Informatics, University of Piraeus (2003) MSc in Information Systems Engineering, UMIST (2004), Piraeus, Dec. 2009.

Papadias et al., "Indexing Spatio-Temporal Data Warehouses", Data Engineering, 2002, Proceedings 18th International Conference on, IEEE, 2002.

Leung et al., "Generalized Data Stream Indexing and Temporal Query Processing", Research Issues on Data Engineering, 1992, Transaction and Query Processing, Second International Workshop on, IEEE, 1992, pp. 124-131.

Chen et al., "LORE: An infrastructure to support location-aware services", IBM Journal of Research and Development vol. 48, No. 5/6, Sep./Nov. 2004 (2004): pp. 601-615.

List of IBM Patents or Patent Applications Treated as Related.

\* cited by examiner

OUTPUT FROM PRE-PROCESSING
TO SPATIAL STORE

| SPATIAL STORE | |
|---|---|
| MODID | THE IDENTITY OF MOVING OBJECT |
| STARTTIME | THE START TIME TO ENTER THIS STATUS (A TIME SLOT) |
| ENDTIME | THE END TIME TO LEAVE THIS STATUS (ENTER A NEW STATUS) |
| ANCHORPOINT (X,Y) | THE ANCHOR (FIRST) POSITION IN THIS PART |
| FLAG | TO INDICATE THE STATUS OF THE ANCHOR POINT, THERE ARE FOUR TYPES OF STATUS: STARTING (FLAG=1), STAYING (FLAG=2), JUNCTION (FLAG=3), UNKNOWN (FLAG=4) |
| LINKID / SUMMARY ID | THE LINKID OR SUMMARY ID THAT THE TRAJECTORY IS MAPPED TO IN THIS INTERVAL, THE SUMMARY ID IS GOT BY ROUTE PATTERN MINING |
| SPEED | THE AVERAGE SPEED IN THIS INTERVAL |

OUTPUT FROM PRE-PROCESSING
TO TIMESERIES STORE

| TIMESERIES STORE | |
|---|---|
| MODID | THE IDENTITY OF MOVING OBJECT |
| TIMESTAMP | TIME |
| POINT(X,Y) | POSITION |
| FLAG | INDICATE A NEW START (A NEW TRIP) |
| OTHER ATTRIBUTES | OTHER PROPERTIES OF SAMPLING POINT |

TRAJECTORY DATA COMPRESSION

CROSS REFERENCE TO RELATED APPLICATION

This application is a continuation of copending U.S. patent application Ser. No. 15/144,379, filed May 2, 2016, the entire contents and disclosure of which are hereby incorporated herein by reference.

STATEMENT OF GOVERNMENT INTEREST

This invention was made with Government support under Contract No.: W911NF-09-2-0053 awarded by the Army Research Office (ARO). The Government has certain rights in this invention.

BACKGROUND

This invention generally relates to compressing spatiotemporal data.

Large volumes of spatiotemporal data are being generated by moving objects (e.g., the connected cars initiative). A key challenge with this data is to simultaneously support: (i) high spatial update rates to handle moving objects, and (ii) high query rates to answer spatial queries (e.g., when an accident happens, notify nearby cars). In order to sustain high query rates, traditional solutions index inputs (and updates) using a spatial index (e.g., DB2 grid index, Informix r-tree index, etc.).

The rate at which a database can support updates depends on the nature of indexing; generally a no-index update is faster than a hash map update (equality query) followed by a b-tree index update (for range queries) followed by a r-tree/grid index update (for spatial queries). The rate of updates (even today and more so in the near projected future) is above the rate at which commercial databases can handle spatial updates (i.e., insert and update spatial index).

SUMMARY

Embodiments of the invention provide a method, computer system and computer readable product for trajectory data compression. In embodiments, the method comprises generating spatial data for one or more moving objects; projecting the spatial data onto a network comprised of a plurality of defined trajectories, the network constraining movement of the one or more moving objects; and storing the projected spatial data in a spatial data store.

In embodiments of the invention, the method further comprises translating updates and queries to the spatial data, using specified data of the network, into links to the spatial data store, and using said links to update and query the spatial data store.

In embodiments of the invention, the method further comprises storing the specified data of the network in a network store.

In embodiments of the invention, each of the defined trajectories includes one or more sub-trajectories, and the projecting the spatial data onto a network includes projecting the spatial data onto the sub-trajectories.

In embodiments of the invention, the moving objects move along the sub-trajectories of the network; and the projecting the spatial data onto the sub-trajectories includes generating one or more data sets for each of the moving objects, each of the data sets including a value representing one of the sub-trajectories along which said each moving object moves.

In embodiments of the invention, each of the data sets for each of the moving objects further includes one or more time values associated with said each moving object and said one of the sub-trajectories along which said each moving object moves.

In embodiments of the invention, said one or more time values includes a time value indicating when said each moving object starts moving along said one of the sub-trajectories.

In embodiments of the invention, said one or more time values includes a time value indicating when said each moving object ends moving along said one of the sub-trajectories.

In embodiments of the invention, each of the data sets for each of the moving objects further includes a spatial value identifying a location of the each moving object along said one of the sub-trajectories.

In embodiments of the invention, each of the sub-trajectories includes a plurality of sample points; and the generating one or more data sets for each of the moving objects includes generating, for said each moving object, one of the data sets at each of the sample points of said one of the sub-trajectories.

As discussed above, the rate at which a database can support updates depends on the nature of indexing; generally a no-index update is faster than a hash map update (equality query) followed by a b-tree index update (for range queries) followed by a r-tree/grid index update (for spatial queries). The rate of updates (even today and more so in the near projected future) is above the rate at which commercial databases can handle spatial updates (i.e., insert and update spatial index). In order to address this challenge, new solutions are required to compress/encode moving object data such that updates are faster, while retaining high query rates.

In embodiments of the invention, updates and queries on spatial data are translated to that of updates and queries on hashmap indexed data and a large but static (i.e., no updates—query only) spatial data. Effectively, large volumes of static spatial data are indexed (which can be done offline)—and this index (S) is designed for high query throughput. In the online mode, spatial updates and queries are translated using this static index S into simple hashmap index updates and queries—which can sustain far higher rates than spatial index updates and queries.

While spatial data has large entropy, embodiments of the invention project the spatial data into a lower entropy space, namely, the road network which constrains the movement of most moving objects like cars, trucks, buses, etc. The road network can be treated as a large volume of static spatial data that is indexed offline. In the online mode, a spatial update is mapped using the static spatial index into an opaque "linkId" (more generally, a poly-line/linestring which represents a sub-trajectory) which then requires only a hashmap update (on the linkId) for insertion. Similarly, a spatial query is mapped using the static spatial index into an opaque "linkId" which is then looked up using the hashmap index—post processing is finally applied to select exact matches to the spatial query.

An offline process is one that may be done at startup, or at regular intervals. It does not have any real-time-ness to it. For example, creating an index of the road network can be done as an offline process since the underlying road network should not change often. An online process is one that is happening as the data are coming in. For example, as a vehicle is moving, its locations are being streamed to the trajectory compression process, and compression is being performed in an online manner.

Embodiments of the invention provide for compressing and indexing spatiotemporal data (data that has a location attribute in addition to timestamps) using a road network graph as a constraint.

Embodiments of the invention provide a method comprising translating updates and queries on spatial data to updates and queries on hash-map indexed data and a large but static spatial data derived from a road network graph. This method can sustain far higher rates of spatial index updates and queries than what can be achieved with conventional spatiotemporal data storage techniques.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide a method, system and computer readable device for compressing spatiotemporal data. As discussed above, large volumes of spatiotemporal data are being generated by moving objects, and a key challenge with this data is to support simultaneously high spatial update rates and high query rates to answer spatial queries. In order to sustain high query rates, traditional solutions index inputs (and updates) using a spatial index. The rate of updates needed today by many spatiotemporal systems, however, is above the rate at which commercial databases can handle spatial updates.

This invention addresses this challenge. Generally, this is done by compressing/encoding moving object data such that updates are faster while retaining the ability to respond to high query rates.

Figure 1:
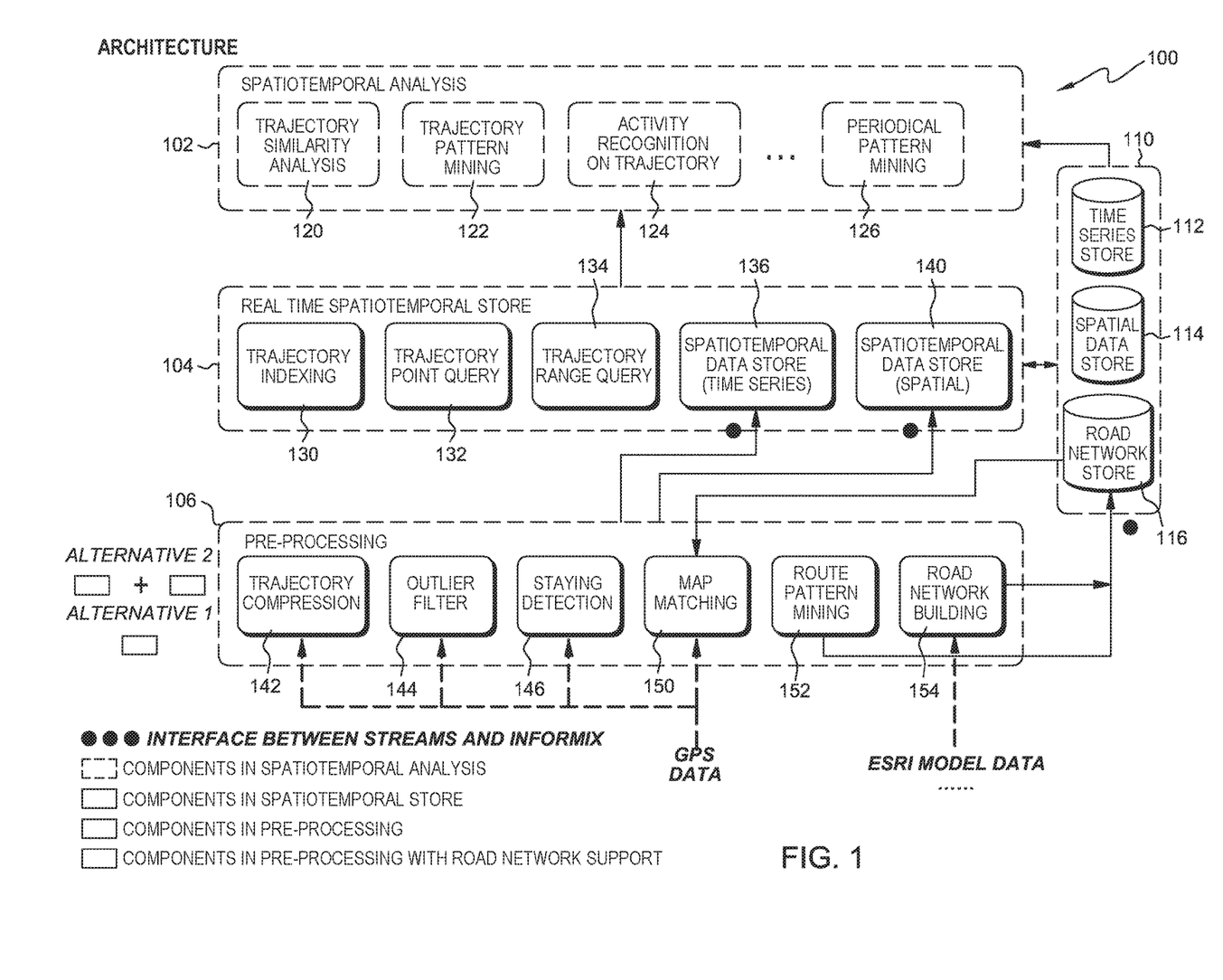
FIG. 1 illustrates an architecture of a spatiotemporal data processing system incorporating embodiments of the invention.

FIG. 1 illustrates the architecture of a spatiotemporal data processing system 100. Generally, the architecture comprises analysis section 102, real time spatiotemporal store 104, pre-processing section 106, and data store 110.

Three types of data are saved in data store 110, time series data 112, spatial data 114, and road network data 114. Analysis section 102 includes the functions used to analyze the data in the data store. These functions include a trajectory similarity analysis 120, trajectory pattern mining 122, activity recognition on trajectory 124, and periodical pattern mining 126. Other data analysis functions may also be provided.

Real time spatiotemporal store 104 includes trajectory indexing 130, trajectory point query 132, trajectory range query 134, spatiotemporal data store (time series) 136, and spatiotemporal data store (spatial) 140.

The pre-processing section 106 provides a number of functions for pre-processing spatiotemporal data, for example, before the data are stored in one of the data stores or processed by one of the other functions provided by architecture 100. In the embodiment shown in FIG. 1, pre-processing 106 includes trajectory compression 142, an outlier filter 144, staying detection 146, map matching 150, route pattern mining 152, and road network building 154.

In embodiments of the invention, architecture 100, and specifically, pre-processing 106, receives input data. For example, the input data may include moving object data, which may be, for instance, global positioning satellite data. Other input data may include road status data.

As discussed above, very large volumes of spatiotemporal data are being generated by moving objects. For example, 100,000 to 1,000,000 cars generating data at a rate of 1,000 plus data points per second, will generate approximately 100 TB of data per year. This huge volume of data presents challenges: real time persistence of data from approximately 100,000 to 1,000,000 vehicles connected into the internet of things Cloud with efficient data store/index to support spatial temporal query, especially for trajectory query.

Figure 2:
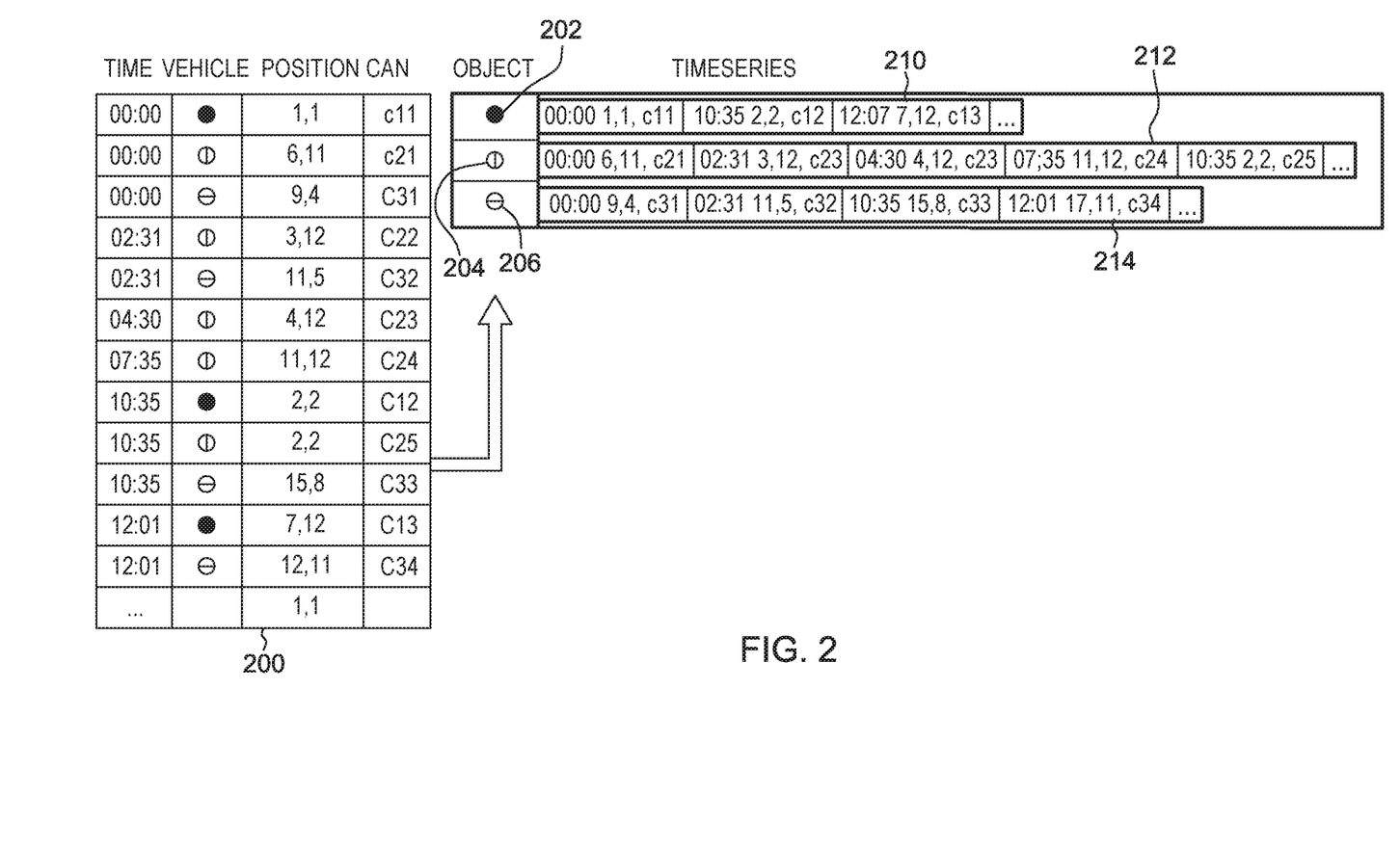
FIG. 2 shows a table having time and position data for several vehicles and three time series formed from that data.

FIG. 2 shows a table 200 having time and position data for three vehicles, represented at 202, 204 and 206, and a time series 210, 212 and 214 for each of these vehicles formed from this data. In particular, for each of these vehicles, the table 200 includes a number of time values, the location of the vehicle at that time, and a CAN value for that location. For instance, the table shows that at time 00:00 vehicle 202 is at location 1,1, vehicle 204 is at location 6,11, and vehicle 206 is at location 9,4. At time 02:31, vehicle 204 is at location 3,12 and vehicle 206 is at location 11,5; and at time 10:35, vehicles 202 and 204 are both at location 2,2, and vehicle 206 is at location 15,8.

The group of time series 210, 212, 214 is formed from this data. Each time series includes a plurality of data sets for one of the vehicles arranged in order of time. Each data set, in turn, includes a time and the position of the vehicle at that time.

These time series representations provide for a compact, efficient storage for an unlimited number of time-indexed observations (locations, CAN, etc.) for each vehicle. This time series representation makes queries of the type "where was X at this time" easy to answer. An example of such a query is: Find out all the trajectory records of public bus 12345 yesterday.

Other queries, though, may be difficult to answer using these time series representations. For instance, the query: "When was X around a given region" may be hard to answer with this time series representations. Extensive scanning of raw data may be needed to answer some types of queries when the data are stored in these time series representations.

Embodiments of the invention provide the ability to search deeply into realtime spatiotemporal data, and embodiments of the invention function as real time spatial temporal historian. Achieving this presents challenges.

One of these challenges is spatial data inserts. To address this challenge, in embodiments of the invention, a continuous trajectory is partitioned into a list of small sub-trajectories, or sub-tracks, and the data for these sub-tracks are inserted as Line_String values with R Tree index but with significant redundancy and index updates. For example, updates may be at a rate of 1 k/second.

Figure 3:
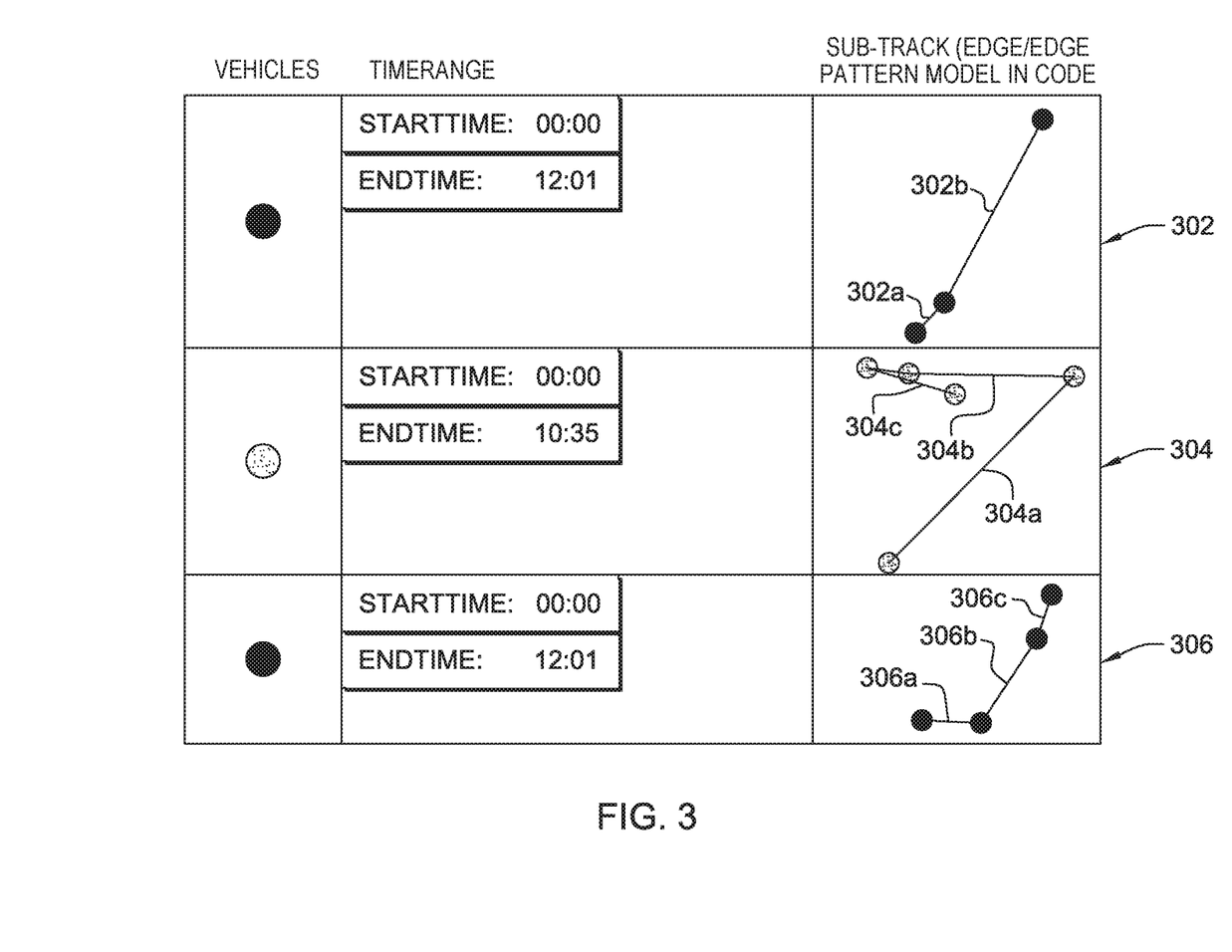
FIG. 3 shows three images showing three vehicle trajectories and sub-track pattern models for those trajectories.

FIG. 3 shows three trajectories 302, 304, 306 partitioned into sub tracks. Trajectory 302 includes sub-tracks 302a and 302b, trajectory 304 includes sub-tracks 304a, 304b and 304c, and trajectory 306 includes sub-tracks 306a, 306b and 3206c. FIG. 3, in addition, gives the start and end times for each of these trajectories.

Embodiments of the invention store the sub-track data in a node network model (by real time map matching) so as to offload the extensive directly updating of track data to the R-tree. Also, together with time series, embodiments of the invention provide redundant sub-track code storage for fast response to typical trajectory queries (Point, Partition, and Join queries) in on-line transaction processing (OLTP) mode.

Queries for which a fast response may be available include, for example: "Find out the most frequently passed gas stations by my fleet in year 2012" (for identifying contract gas stations); and "Find out the taxi that passed through this specific point of interest (POI) yesterday between 9:00-9:20" (for handling item lost claims). Embodiments of the invention can provide fast responses to other types of queries.

Embodiments of the invention provide a spatiotemporal store and query based on a network model. The store and query operations use time series to store spatial and temporal data for moving objects, store sub-trajectory data as a linked list in the road network, and use UDR for spatiotemporal query of moving objects.

Figure 4:
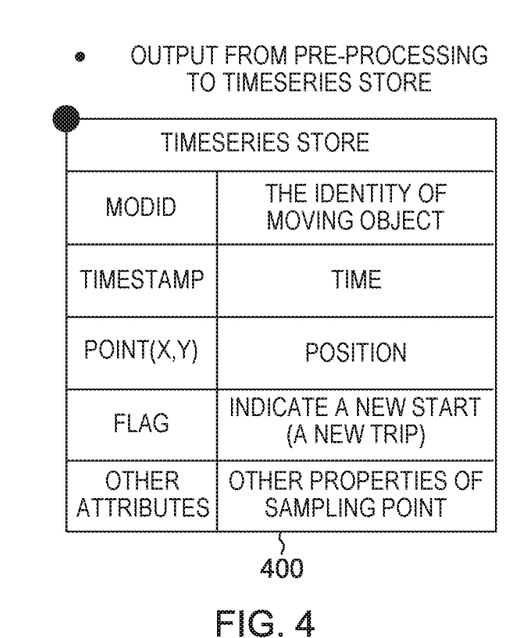
FIG. 4 is a table storing spatiotemporal data about a vehicle.
Figure 5:
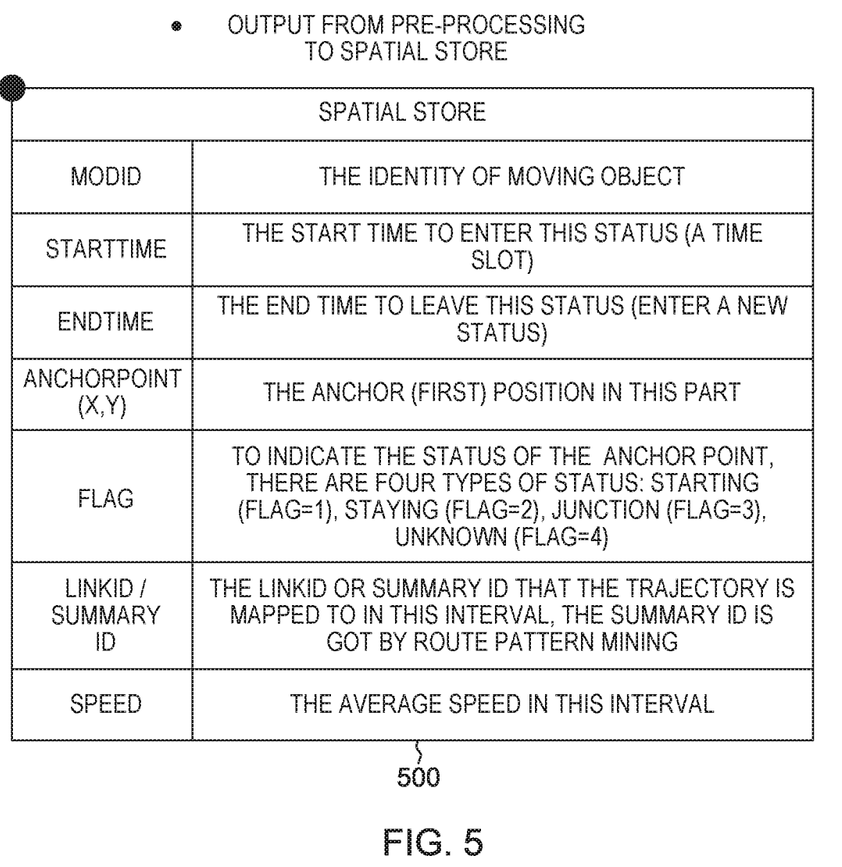
FIG. 5 shows a table that stores spatial data

FIGS. 4 and 5 show two tables that may be used in embodiments of the invention. FIG. 4 shows a table 400 of output from pre-processing 106 of FIG. 1 to time series store 110, and FIG. 5 shows a table 500 of output from this pre-processing to spatial store.

More specifically, the table 400 of FIG. 4 shows time series data for a particular moving object. With the example shown in FIG. 4, this data includes the identity (modid) of the moving object, a time or timestamp, the position (point x,y) of the moving object at that time, a flag to indicate whether this data are a new start (a new trip for the moving object), and other properties of the sampling point.

The table 500 of FIG. 5 shows spatial data. As shown in the FIG. 5, this table includes the identity (modid) of the moving object, the start time at which the object enters a particular sub-trajectory, the time at which the object leaves that sub-track, and the first position, referred to as the anchor point, of the object on that sub-trajectory. The table also includes a flag to indicate the status of that anchor point. As discussed in more detail below, there are four types of status, referred to as starting, staying, junction, and unknown.

In embodiments of the invention, the table of FIG. 5 also includes a link or summary id, which is the link or summary that the trajectory is mapped to in this interval. The summary can be obtained by route pattern mining. In addition, this table includes the average speed of the object in this interval.

Figure 6:
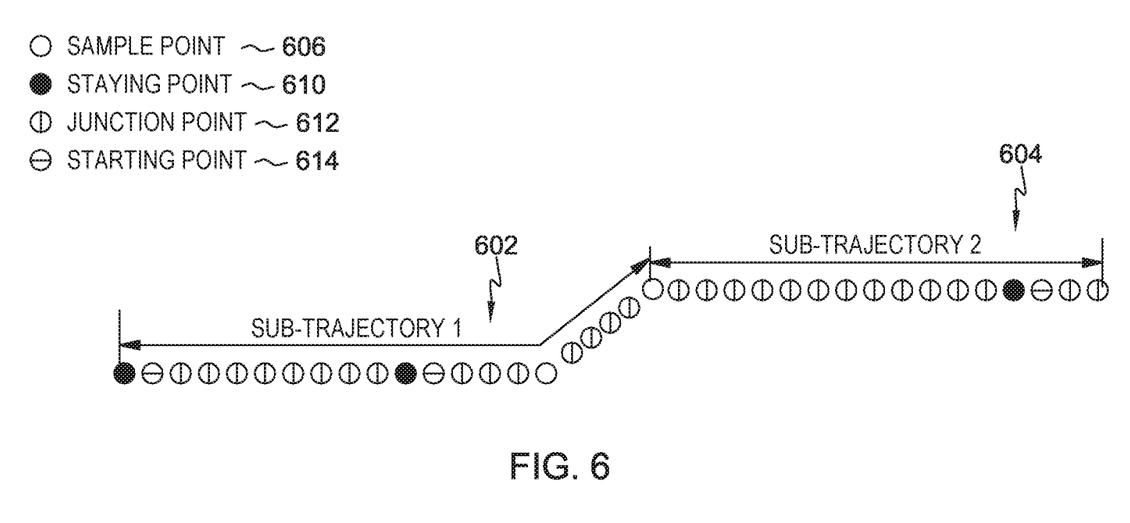
FIG. 6 illustrates sub-trajectories of a trajectory and various points of interest along those sub-trajectories.

FIG. 6 illustrates two sub-trajectories 602, 604 and a number of pre-specified points on those sub-trajectories. There are four categories for the points: sample points 606, staying points 610, junction points 612 and starting points 614. Individual points may be in more than one category. All the pre-specified points are considered as sample points, and starting points are the points on a sub-trajectory at which the moving object starts on that sub-trajectory. Staying points are the points on a sub-trajectory to which the moving object moves while staying on the sub-trajectory, and junction points are the points at the junction of two sub-trajectories.

In embodiments of the invention, there are data requirements for preprocesses in streams. For a timeseries store using the timeseries table, pre-process requirements include filtering/adjusting outliers using a matched route, finding starting points among raw points, and compressing raw data. This compression should guarantee correction of linear interoperation (less than deviation) when uncompressing. The pre-process requirements also include inserting junction points among raw points. Embodiments of the invention estimate timestamps for the junction points.

The data to be stored includes raw points with starting flag after compression and junction points.

Also, time values are inserted. When a sample point goes to pre-processing, there can be three kinds of outputs: (1) no output: the sampling point is filtered out or compressed; (2) output the input sample point; and (3) output two points (the first point is the junction point, and the second point is the sample point. If the sampling point is a junction point, just the input sample point is output.). Batch insert can be used.

For spatial store using linkid, pre-process requirements include identifying point status (starting point, staying point, junction point, etc.) and matching to linkid. The pre-process requirements also include processing summary linkid for proper situation. The data to be stored includes records for status changes. In addition, time values are inserted. For example, when a new status is entered, the previous status is recorded to the sub-track table. Batch insert can be used. Embodiments of the invention may use time outs when there is no new status or no GPS reporting for a specified time.

Figure 7:
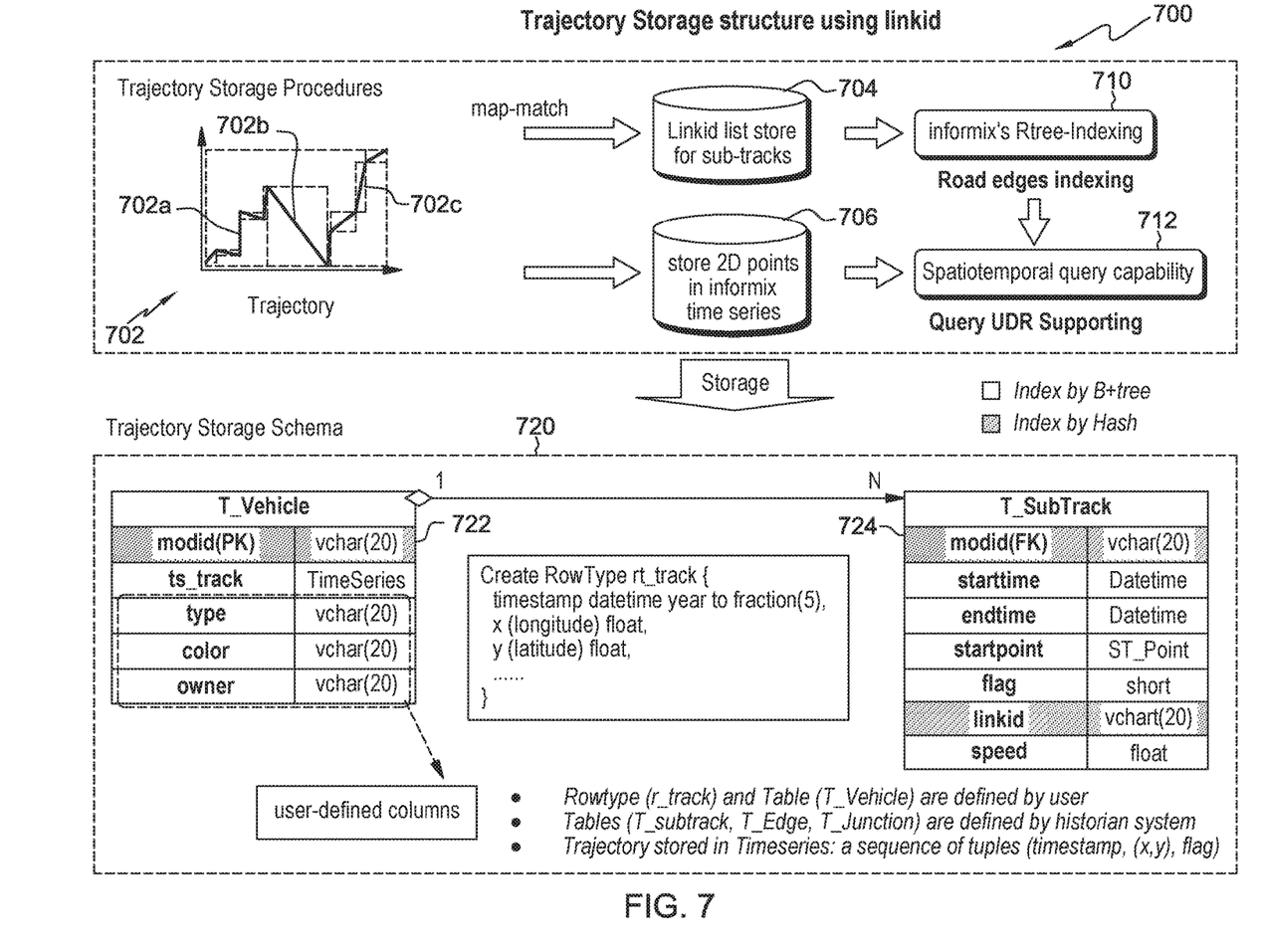
FIG. 7 illustrates a trajectory storage structure and procedure in accordance with an embodiment of the invention.

FIG. 7 illustrates trajectory storage structure 700 using linkid. In FIG. 7, a trajectory of a moving object is shown at 702. This trajectory is comprised of a series of sub-trajectories including sub-trajectories 702a, 702b and 702c. Map-matching is used to map these sub-trajectories to a Linkid store 704 for sub-tracks. Given x,y coordinates identify the sub-tracks. Redundant storage 706 is provided by storing two-dimensional point data in time series store.

Data in store 704 may be accessed by Rtree-indexing represented at 710, and road edges indexing can also be done. The data in store 704 provides spatiotemporal query capability, represented at 712. Query UDR is also supported.

A trajectory storage schema 720 is also represented in FIG. 7. This storage schema provides a table 722 for each vehicle (T_Vehicle) and a table 724 for each subtrack (T_Subtrack). For each vehicle, the table 722 stores the vehicle id (modid(PK)), and a time series (ts_track). For this time series, a row is created; and values including a timestamp, datetime, year data, x and y position values, and a flag, are stored. Other information, such as the vehicle type, color and owner, may also be stored in the table in user defined columns.

Each sub-track table 724 stores a vehicle id (modid(FK)), the start time of the vehicle on the sub-track, the end time of the vehicle on the sub-track, and the starting point of the vehicle on the sub-track. The table 724 may also store a flag, a linkid, and the speed of the vehicle on the track.

In this trajectory storage schema 720, Rowtype (r_track) and Table (T_Vehicle) are defined by a user. Tables (T_sub-track, T_Edge, T_Junction) are defined by historian system. Trajectory is stored in Timeseries: a sequence of tuples (timestamp, (x,y), flag).

Embodiments of the invention provide real time persistence of 3V moving object data for efficient historical typical trajectory oriented query, including point query, range query, and join query.

Point queries are related to a single trajectory. These include queries such as "Where was X at this time?" To answer such a query, a timeseries query function is reused directly to get row data (trajectory) according to a time range. Point queries also include queries such as "When was X at this location?" Other types of point queries include, for instance, trajectory retrieve queries, and queries about a relationship with region R within distance d. For example, a query may be for an object id within distance d from region R between a start time and an end time (the object is considered to "cross" the region). Other queries may be for an object id within distance d from region R always between a start time and an end time (the object is considered to be "within" the region), and a query for an object id that stays in region R for at least an interval of time between a start time and an end time (the object is considered as "staying" in the region).

Another type of point query involves a number of points of interest (POI). For example, a query may be, from many points of interest, find the ones which satisfy the spatiotemporal relationship to the trajectory (KNN-POI). A query of this type may be used, for instance, to find the closest gas station to this trajectory between a start time and an end time.

Range queries retrieve trajectories that stand in certain relationships to a region. These include queries of the type where a specified condition is satisfied by the objects that stand in certain relationships (e.g., within distance x) to a region R, during time T. Example range queries ask to find moving objects within distance d from R sometime between a start time and an end time (the objects are considered to "cross" the region), and to find moving objects within distance d from R always between a start time and an end time (the objects are considered to be "within" R). Another example range query is to find moving objects that stay in R for at least a time interval between start time and end time (the objects are considered as "staying" in the region).

Another type of range query asks for moving objects which satisfy the spatiotemporal relationship to a specified point or point. An example K-NN query would be: find the K nearest moving objects to region R at a specific time.

Join queries are for identifying relationships between trajectories. As an example, a join query asks for trajectories within a distance threshold (i.e., pair distance of two trajectories). As another example, a join query asks for spatiotemporal regions which are frequently passed by a set of trajectories (frequent pattern mining).

Figure 8:
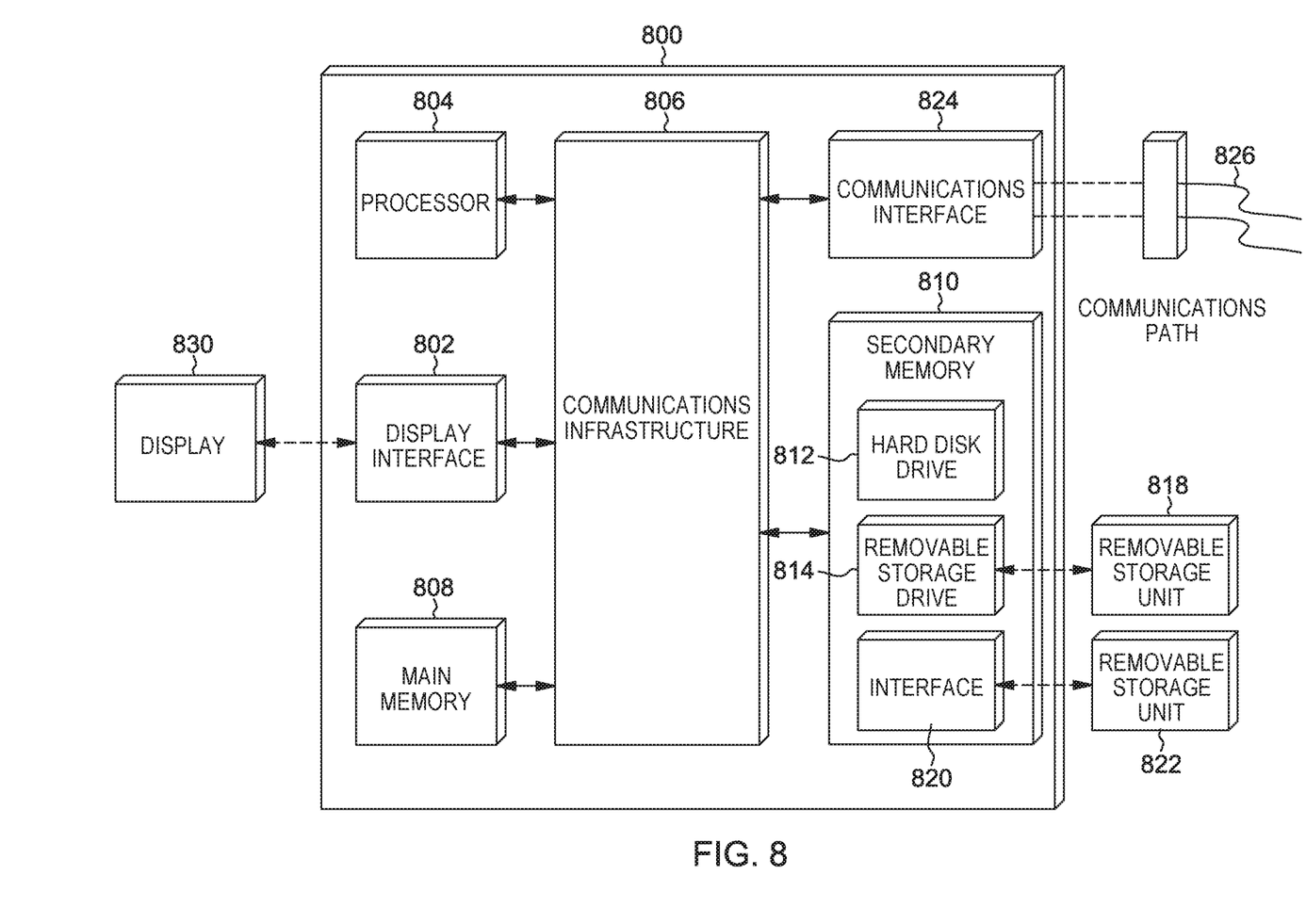
FIG. 8 depicts a computing environment in which embodiments of the invention may be implemented.

As will be apparent to those of ordinary skill in the art, any suitable processors, computers and servers may be used in embodiments of the invention, and FIG. 8 illustrates a computer system 800 in which embodiments of the present disclosure, or portions thereof, may be implemented. A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit, and a hard disk installed in a hard disk drive.

Processor device 804 may be a special purpose or a general purpose processor device. The processor device 804 may be connected to a communications infrastructure 806, such as a bus, message queue, network, multi-core message-passing scheme, etc. The network may be any suitable network and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 418 in a well-known manner. The removable storage unit 418 may include a removable storage media that may be read by and written to by the removable storage drive 814. Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive).

The computer system 800 may also include a communications interface 824 configured to allow software and data to be transferred between the computer system 800 and external devices. Exemplary communications interfaces 824 may include a modem, a network interface (e.g., an Ethernet card), a communications port, a PCMCIA slot and card, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810.

Those of ordinary skill in the art will appreciate that the hardware depicted in FIG. 8 may vary. The depicted example is not meant to imply architectural limitations with respect to the present invention.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A computer-implemented method of trajectory data compression comprising:
   generating, in a computer processor system, spatial data for one or more moving objects;
   projecting, by the computer processor system, the spatial data onto a network comprised of a plurality of defined trajectories, the network constraining movement of the one or more moving objects to the defined trajectories;
   storing, by the computer processor system, the projected spatial data in a spatial data store, including,
      for each of the one or more moving objects, storing in a spatial data table, an identification of the each moving object, and a link to one of the trajectories on which said each moving object moves;
   storing, by the computer processor system, time series data in a time series store, including,
      for each of the one or more moving objects, storing a time series data set in a time series table, the time series data set including an identification of the each moving object, a time value identifying a time, and position data identifying a position of the each moving object at said time; and
   mapping spatial updates and queries into links stored in the spatial data table.

2. The method according to claim 1, wherein the storing the projected spatial data in a spatial data store further includes, for each of the one or more moving objects, storing in the spatial data table, a start time at which the each moving object enters the one of the trajectories.

3. The method according to claim 2, wherein the storing the projected spatial data in a spatial data store further includes, for each of the one or more moving objects, storing in the spatial data table an end time at which the each moving object leaves said one of the trajectories.

4. The method according to claim 1, wherein the storing the projected spatial data in a spatial data store further includes, for each of the one or more moving objects, storing in the spatial data table a first position of the each moving object on said one of the trajectories.

5. The method according to claim 4, wherein the storing the projected spatial data in a spatial data store further includes, for each of the one or more moving objects, storing in the spatial data table a flag indicating a defined status of said first position of the each moving object on said one of the trajectories.

6. The method according to claim 5, wherein the flag indicates that said first position is a junction of two of the trajectories.

7. The method according to claim 1, wherein the time series data set for each of the moving objects further includes a flag to indicate whether the data in the time series data set are for a new trip for the each moving object.

8. The method according to claim 1, wherein the storing, for each of the one or more moving objects, a time series data set in a time series table includes storing in the time series data set data for the each moving object at each of a group of given sampling points.

9. The method according to claim 8, wherein the group of sampling points are on the one of the trajectories.

10. The method according to claim 9, further comprising:
sending to a pre-processing unit the data obtained for the each moving object at the group of given sampling points; and
the pre-processing unit pre-processing said obtained data before the obtained data is stored in the data store.

11. A computer system for trajectory data compression comprising:
a storage device storing program code: and
one or more processor units connected to the storage device for executing the program code for:
receiving spatial data for one or more moving objects;
projecting the spatial data onto a network comprised of a plurality of defined trajectories, the network constraining movement of the one or more moving objects, to the defined trajectories;
storing the projected spatial data in a spatial data store, including,
for each of the one or more moving objects, storing in a spatial data table, an identification of the each moving object, and a link to one of the trajectories on which said each moving object moves;
storing time series data in a time series store, including,
for each of the one or more moving objects, storing a time series data set in a time series table, the time series data set including an identification of the each moving object, a time value identifying a time, and position data identifying a position of the each moving object at said time; and
mapping spatial updates and queries into links stored in the spatial data table.

12. The computer system according to claim 11, wherein the storing the projected spatial data in a spatial data store further includes, for each of the one or more moving objects, storing in the spatial data table, a start time at which the each moving object enters the one of the trajectories.

13. The computer system according to claim 12, wherein the storing the projected spatial data in a spatial data store further includes, for each of the one or more moving objects, storing in the spatial data table an end time at which the each moving object leaves said one of the trajectories.

14. The computer system according to claim 11, wherein the storing the projected spatial data in a spatial data store further includes, for each of the one or more moving objects, storing in the spatial data table a first position of the each moving object on said one of the trajectories.

15. The computer system according to claim 11, wherein the time series data set for each of the moving objects further includes a flag to indicate whether the data in the time series data set are for a new trip for the each moving object.

16. A computer program product comprising:
a computer readable storage medium having computer program code tangibly embodied therein for trajectory data compression, the computer program code, when executed in a computer system, performing the following:
receiving spatial data for one or more moving objects;
projecting the spatial data onto a network comprised of a plurality of defined trajectories, the network constraining movement of the one or more moving objects to the defined trajectories;
storing the projected spatial data in a spatial data store, including,
for each of the one or more moving objects, storing in a spatial data table, an identification of the each moving object, and a link to one of the trajectories on which said each moving object moves;
storing time series data in a time series store, including,
for each of the one or more moving objects, storing a time series data set in a time series table, the time series data set including an identification of the each moving object, a time value identifying a time, and position data identifying a position of the each moving object at said time; and
mapping spatial updates and queries into links stored in the spatial data table.

17. The computer program product according to claim 16, wherein the storing the projected spatial data in a spatial data store further includes, for each of the one or more moving objects, storing in the spatial data table, a start time at which the each moving object enters the one of the trajectories.

18. The computer program product according to claim 17, wherein the storing the projected spatial data in a spatial data store further includes, for each of the one or more moving objects, storing in the spatial data table an end time at which the each moving object leaves said one of the trajectories.

19. The computer program product according to claim 16, wherein the storing the projected spatial data in a spatial data store further includes, for each of the one or more moving objects, storing in the spatial data table a first position of the each moving object on said one of the trajectories.

20. The computer program product according to claim 16, wherein the time series data set for each of the moving objects further includes a flag to indicate whether the data in the time series data set are for a new trip for the each moving object.

\* \* \* \* \*